United States Patent Office 3,819,765
Patented June 25, 1974

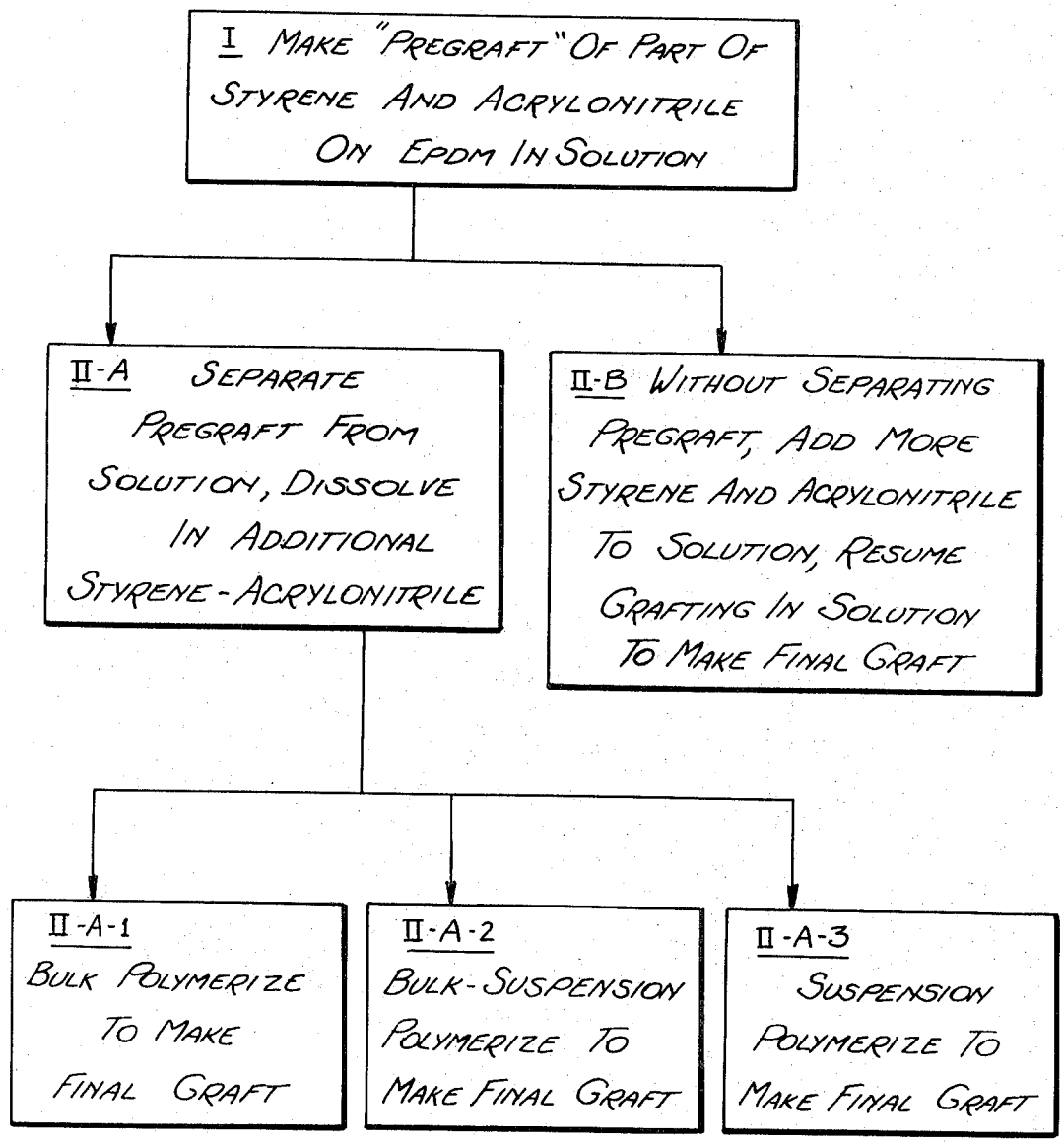

3,819,765
GRAFT COPOLYMERIZATION OF ALPHA-MONO-OLEFIN COPOLYMER RUBBERS TO MAKE GUM PLASTICS
Francis X. O'Shea, Nagatuck, Conn., assignor to Uniroyal, Inc., New York, N.Y.
Original application Dec. 30, 1968, Ser. No. 787,984, now Patent No. 3,642,950. Divided and this application July 21, 1971, Ser. No. 164,542
The portion of the term of the patent subsequent to Mar. 21, 1989, has been disclaimed
Int. Cl. C08f 15/04
U.S. Cl. 260—878 R    1 Claim

ABSTRACT OF THE DISCLOSURE

A two-stage method of grafting on EPM or EPDM rubber to make a tough, impact-resistant gum plastic:
(I) A portion only of resin forming monomer (e.g., styrene, acrylonitrile) is first "pregrafted" in solution on the EPM or EPDM rubber spine;
(II) The remaining amount of resin-forming monomer is combined with the lightly grafted rubber, and subjected to further graft polymerization to produce the final gum plastic.
New graft copolymers of resin-forming monomers on ethylene/propylene/5-ethylidene-2 - norbornene terpolymer rubber are also disclosed.

---

This application is a division of my copending application Ser. No. 787,984 filed Dec. 30, 1968, now U.S. Pat. 3,642,950.

The invention relates to graft copolymers of resin-forming monoethylenically unsaturated monomers on rubbery copolymers of at least two alpha-monoolefins and 5-ethylidene-2-norbornene.

The preparation of tough, impact resistant plastics by the grafting of resin-forming monomers onto elastomeric spines is well known. Examples of such materials which are prepared commercially are high-impact polystyrene and the "ABS" resins. The latter materials, for example, are graft polymers of styrene and acrylonitrile onto butadiene elastomers such as SBR or cis-polybutadiene.

Since the elastomeric component or "spine" in such compositions is an unsaturated elastomer, it is susceptible to oxidative degradation, particularly photo-initiated oxidation. Since the elastomeric component is responsible for the impact resistance of these compositions, it is not surprising that exposure of such materials to outdoor weathering leads to deterioration of properties, particularly a serious decay in impact resistance. Such materials are therefore very restricted as to utility in outdoor applications.

It is therefore understandable that polymer chemists have endeavored to design gum plastic compositions which are resistant to photo-initiated oxidation. One approach to such materials is the use of a saturated hydrocarbon elastomer as the spine. For this reason, a number of disclosures have been made concerning grafts onto ethylene-propylene rubbers; see for example:

1. Zimmerman and Jones, U.S. Pat. 3,162,696, Dec. 22, 1964.
2. G. Natta et al., Chem. E. Ind., 47 (9), 960 (1965).
3. G. Natta et al., Chem. E. Ind., 47 (9), 384 (1965).
4. G. Natta et al., U.S. Pat. 3,288,739, Nov. 29, 1966.
5. Belgian Pat. 665,220 to Chemische Werke Huls, June 10, 1965.
6. British Pat. 1,059,948, to PCM Et Plastiques Kleber Colombes, Feb. 22, 1967.
7. Belgian Pat. 685,867, to Monsanto, Feb. 23, 1967.
8. J. Pellon and K. J. Valan, J. Appl. Poly. Sci., 9, 2955 (1965).
9. M. Pegoraro and F. Severini, Chem., Ind., 48 (11), 1162 (1966).
10. G. Natta et al., Rubber Chem. and Tech., 39, 1667 (1966).
11. U.S. Pat. 3,435,096, Limbert and Paddock, Mar. 25, 1969.

In this previous work it has been well recognized that grafting is difficult to accomplish on an ethylene-propylene spine. Since grafting on the commonly used unsaturated elastomer spines such as polybutadiene is believed to take place through active allylic positions, the lack of such active allylic sites in saturated spines may account for the difficulty in grafting onto such spines. In efforts to overcome with difficulties, various workers have attempted to activate such spines for grafting by various chemical treatments such as peroxidation (reference (4) above) or ozonization (reference (6) above). Such processes have not been entirely satisfactory both in regard to polymer properties and to the cost of such treatments.

It would be desirable to employ ethylene-propylene-non-conjugated diene terpolymer rubbers as the spine component since such terpolymers combine a saturated backbone for resistance to photooxidation with pendant unsaturation for improved grafting. By employing the presently known methods of graft polymerization, graft polymers have been prepared using such terpolymers as gum plastic spines. Nevertheless, it has been desired to provide a more satisfactory graft polymerization method, and to improve the properties of such gum plastics, particularly with regard to impact strength.

SUMMARY OF THE INVENTION

In accordance with the invention, it has now been found that gum plastic compositions having superior properties may be prepared by a unique, economically advantageous two-step process.

(I) In the first step of this process an elastomeric spine rubber which is a copolymer of at least two different alpha-monoolefins, dissolved in an inert solvent, is "pregrafted" with up to 150% of its weight of a resin-forming monomer or combination of monomers.

(II) The "pregrafted" rubber is then mixed with additional resin-forming monomer or combinatoin of monomers and converted in the second step of the process, by further graft polymerization, to a final gum plastic containing up to 25% of the elastomeric component.

(II-A) In one form of the invention, the "pregrafted" rubber resulting from graft polymerization in solution in the first step of the process is isolated from such solution, and thereafter, in the second step of the process, dissolved in the additional resin-forming monomer or combination of monomers, and subjected to (1) bulk,
(2) bulk-suspension, or
(3) suspension polymerization, to provide the final gum plastic.

(II-B) In another form of the invention, the "pregrafted" rubber need not be isolated from the solution in which the initial graft polymerization is carried out, but instead the additional resin-forming monomer or monomers are added to the solution of "pregraft," and graft polymerization in solution is continued to produce the gum plastic.

Brief Description of the Drawing

The invention will be described with reference to the accompanying drawing, which is a flow diagram representing successive steps in typical practice of the invention.

Description of the Preferred Embodiments

It will be seen from the working examples below that the two-step processes of the invention lead to polymer products having unexpected and remarkably superior properties compared with products prepared by either step alone.

The working examples demonstrate quite clearly that attempts to prepare a useful gum plastic on ethylene-propylene copolymer or ethylene-propylene-non-conjugated diene terpolymer spines by a bulk, bulk-suspension or suspension process are plagued with difficulties. One problem encountered in such grafts is that of difficult solubility in the monomers. For example, a typical spine is insoluble in a 70/30 mixture of styrene and acrylonitrile. It may be handled by dissolving the spine in styrene and slowly adding acrylonitrile with heating. Often, however, even this technique leads to precipitation of the elastomer as an insoluble mass and the polymerization cannot be carried out. "Pregrafting" of the elastomer in solution generally enhances the solubility of the elastomer in the monomers, leading to greater success in dissolving the elastomer and successfully carrying out the polymerization.

In addition, attempts to carry out a direct bulk, bulk-suspension or suspension polymerization on such spines commonly gives material with very low impact strength. Separation and analysis of the graft components indicates that the low level of impact strength is the result of poor grafting of the spine. By use of the two step method described in this invention, excellent impact strength can be obtained using the same spine. Separation and analysis of these materials show that more efficient grafting is obtained.

Although grafting in solution followed by blending of the graft with separately prepared resin can, in some cases, give a material of moderate impact strength, such blends are consistently inferior to the high impact strength products obtained from the same solution grafts by employing the second step of the process of this invention.

The elastomeric spines which can be employed in the process of this invention include copolymers of at least two different straight-chains alpha-monoolefins, such as ethylene, propylene, butene-1, octene-1, with or without at least one other copolymerizable monomer, whether a monoene or a polyene, usually a diene, typically a non-conjugated diene. Preferably one of the alpha-monoolefins is ethylene; usually there are two alpha-monoolefins in the copolymer. Particularly preferred copolymers are the ethylene-propylene-non-conjugated diene ternary copolymers. The non-conjugated dienes used in the preparation of terpolymer elastomers may include open chain non-conjugated dienes such as 1,4-hexadiene and also cyclic (especially bridged ring) non-conjugated dienes such as dicyclopentadiene, 5-methylene-2-norbornene, 5 - ethylidene - 2 - norbornene and 1,4-cyclooctadiene. The weight ratio of alpha-monoolefins in the elastomers may range from 40/60 to 75/25. The content of additional monomer(s), such as non-conjugated diene, in the copolymer may range from about 1% to about 20% by weight. Suitable binary copolymer rubbers are described for example in British patent 886,368, United States Rubber Company, January 3, 1962, and suitable terpolymers are disclosed for example in British Pat. 1,014,874, United States Rubber Company, Dec. 31, 1965 and British Pat. 1,107,936, Sumitomo Chemical Co. Ltd., May 13, 1966. For optimum solubility it is preferred that the elastomer have a 212° F. Mooney viscosity of less than 60 (ML–4) although higher molecular weight elastomers may be used.

The monoethylenically unsaturated resin-forming monomers which may be employed include such free-radical polymerizable monomers as the aromatic vinyl monomers such as styrene and substitution products of styrene such as alphamethylstyrene and p-chlorostyrene, alkenoic acids, esters or nitriles such as acrylic acid, methacrylic acid, alkyl acrylates (e.g., ethyl acrylate), alkyl alkacrylates (e.g., methyl methacrylate), acrylonitrile and methacrylonitrile, vinyl esters such as vinyl acetate, vinyl ethers such as ethyl vinyl ether, vinyl chloride, vinylpyridine, methyl vinylpyridine and esters of maleic and fumaric acids (e.g. diethyl fumarate, bis(2,3 - dibromopropyl) fumarate). The monomer may be used alone or in combination with one or more of the other monomers. Additional description of suitable ethylenically unsaturated free radical polymerizable monomers will be found in U.S. Pat. 3,271,477, Kresge, Sept. 6, 1966 and U.S. Pat. 3,435,096 referred to above, the disclosures of which are hereby incorporated herein by reference.

In the first step (designated "I" in the drawing) of the process of the invention, the elastomer is dissolved in a conventional inert solvent, which may be aliphatic, cycloaliphatic, or aromatic, whether a hydrocarbon such as hexane, dodecane, cyclohexane, benzene, xylene, Tetralin, etc., or an equivalent substituted hydrocarbon, as in such halogenated solvents as chlorobenzene, chloroform, carbon tetrachloride, ethylene dichloride, tetrachloroethylene, etc. Other solvents may be used provided the elastomer is soluble therein.

Preferred solvents are those which are good solvents for the elastomer, the grafting monomers and the resin formed therefrom. The choice of solvent will therefore sometimes depend upon the grafting monomers used. Aromatic hydrocarbons are particularly suitable in most cases.

Particularly preferred solvents are those which do not adversely affect grafting reactions through chain transfer. We have found benzene to be the solvent of choice in many cases.

The monomer or monomers to be used in the first stage are then added. The ratio (by weight) of rubber to monomers may range from 40/60 to 90/10. The preferred ratio is from 60/40 to 80/20. Polymerization is initiated by a conventional free radical initiator used for polymerizing such monomers. Mention may be made of organic peroxides, hydroperoxides, azo compounds and the like. Organic peroxides constitute a particularly useful class of initiator represented by compounds such as benzoyl peroxide, methyl ethyl ketone peroxide, di-t-butyl peroxypivalate. Among the hydroperoxides and azo compounds may be mentioned cumene hydroperoxide, t-butylhydroperoxide and azobisisobutylronitrile. Particularly preferred initiators are those which generate alkoxy or primary alkyl radicals since these result in more efficient grafting onto the elastomer spine.

In some cases the grafting may proceed at room temperature (e.g. 20° C.) but it is more usual to heat the mixture (e.g., to an elevated temperature of at least 50° C., up to 100° or 150° C., or even higher, up to for example, 200° C. or more) to speed up the rate of decomposition of the initiator. The solution is usually agitated during the grafting but this is desirable only to provide for removal of the heat of polymerization. The reaction is continued until a desired degree of conversion of the monomers has been achieved. In some cases appreciable grafting takes place within reaction periods of as little as about 1 hour, but it is more usual to continue the reaction for at least several hours (e.g., 3 to 12 hours), and in some cases even longer reaction times (e.g. 1–4 days) may be desirable. In general, the reaction time is usually inversely related to the temperature, and the concentration and activity of the initiator.

The product of the foregoing solution graft polymerization step, hereinafter designated as the "pregraft," is then, in one form of the invention (depicted as "II–a" in the drawing), isolated by any suitable conventional means such as by evaporation, steam volatilization or by precipitation into a non-solvent for the pregraft. The pregraft is then dried and analyzed.

The pregraft is then dissolved in a suitable quantity of the monomer or monomers, which may be the same as or different from the monomer or monomers employed in the initial solution polymerization step. It is preferred, however, that they be the same since generally superior properties are obtained when this is the case. The pregraft/monomers ratio may range from 50/50 to 5/95, the preferred range being from 30/70 to 15/85. It is preferred that the rubber content of the final product does not exceed 25%. For practical reasons, the weight of the pregraft is taken as the weight of the entire product of the first stage of the polymerization, although it will be understood that in practice the "grafting efficiency" is not 100%, so that the so-called pregraft actually contains, in addition to true graft copolymer per se, indeterminate, small amounts of ungrafted rubber and free resin.

The mixture is then further polymerized (for example under the temperature conditions described for the "pregrafting" step) by a conventional (1) bulk, (2) bulk-suspension or (3) suspension process.

The expression "bulk polymerization" is used in its conventional sense to refer to polymerization of the monomer without a solvent or dispersing liquid (Schildknecht, "Vinyl and Related Polymers," page 9). In this step (represented as II–A–1 in the drawing), the pregraft, dissolved in the additional monomer(s), is subjected to polymerization conditions which may be the same as those previously described above in connection with the initial pregrafting step. Usually the bulk polymerization involves heating the mass at a temperature of 50° C. to 200° C. for a period of 1 to 48 hours or more. Polymerization may be completely thermal or a free radical initiator may be added to facilitate the polymerization. During this step a modifier such as a long chain alkyl mercaptan may be added to regulate molecular weight.

Suitably the bulk polymerization mixture is agitated to facilitate the removal of the heat of polymerization as well as to ensure the proper dispersion of the elastomeric phase. For example the polymerization may be carried out to high conversion in a continuous manner by the use of a plastics polymerizer-extruder wherein the mixture is agitated until polymerization is essentially complete. A more extensive description is provided by J. L. Amos et al., U.S. Pat. 2,604,692, Nov. 16, 1954.

Alternatively, the bulk polymerization may be carried out to substantially less than complete conversion, for example, 50 to 70%, in a high viscosity reactor (such as that described in U.S. Pat. 3,243,481, Ruffing et al., Mar. 29, 1966). The polymer may be isolated by flashing off unreacted monomers at reduced pressure and then further devolatilizing the product in a devolatilizing extruder. A variation of this method is to employ an inert diluent instead of unreacted monomers to control the viscosity. Polymerization may then be carried out to high conversion and the diluent removed from the polymer in the same manner.

In the bulk-suspension method of carrying out the second step of the grafting, the expression "bulk-suspension" is used in its conventional sense as referring to a process in which an initial stage is carried out in bulk and a final stage is carried out in suspension (see Schildknecht, page 17). Thus, to carry out the second step by bulk-suspension (represented as step II–A–2 in the drawing), the pregraft, dissolved in the additional monomer(s), is subjected to polymerization conditions, that is, typically heated at a temperature of from about 50° C. to about 100° C.) until from 10% to 45%, preferably 15 to 30%, of the monomer(s) has been converted to polymer. Again, polymerization may be completely thermal or a free radical initiator may be added to facilitate the polymerization; a modifier may be present to regulate molecular weight. Suitably the mixture is agitated to facilitate the removal of the heat of polymerization as well as to ensure the proper dispersion of the elastomeric phase. This step generally takes from 1 to 8 hours.

The mixture is then suspended in an aqueous system containing a suspending agent and polymerization is continues to from polymer beads. Temperatures may range from about 50° C. to about 150° C., a pressure vessel being required at the higher temperatures. Additionally initiator may be added, generally prior to suspension, in order to facilitate conversion during this step.

For a more extensive description of the bulk-suspension process, reference may be made to the following patents:

K. W. Doak and F. E. Canrock, U.S. 3,309,422, Mar. 14, 1967
L. Lee, U.S. 3,278,642, Oct. 11, 1966
L. Lee, U.S. 3,346,520, Oct. 10, 1967
British 1,005,681 to Monsanto, Co., Sept. 29, 1965
British 1,020,176 to Rexall Co., Feb. 16, 1966.

In a third method of completing the graft polymerization, the solution of pregraft in additional monomer(s) is subjected to suspension polymerization (step II–A–3 in the drawing). By "suspension polymerization" is meant that conventional polymerization technique (otherwise known as granular, bead or pearl polymerization) described in Schildknecht, page 17, in which the polymerization occurs in droplets of the monomeric material (suspended in an aqueous medium) of much greater size than those present in emulsion polymerization. Thus, step II–A–3 involves stirring the solution of the pregraft dissolved in the additional monomers in a large volume of water to disperse the organic phase throughout the water in the form of small droplets. The polymerization takes place within the monomer droplets and the water serves to remove the heat of polymerization. A suspending agent is employed in order to keep the organic phase in suspension. Generally a free radical initiator is added to the solution prior to suspending in order to facilitate conversion of the monomer to polymer. A modifier such as a long chain alkyl mercaptan may be added to regulate molecular weight. Temperatures may range from about 50° C. to about 150° C., a pressure vessel being required at the higher temperatures. The finished polymer is isolated in the form of beads.

For a more extensive description of the suspension process, reference may be made to the following patents:

J. B. Ott, U.S. 3,051,682, Aug. 28, 1962
C. P. Ronden and J. Yu, U.S. 3,328,374, June 27, 1967.

In an alternative method of practicing the invention, which we call the "all-solution" method, represented as step II–B in the drawing, the pregraft need not be separated from the solution, but instead the required additional quantity of resin-forming monomer(s) is added directly to the solution of pregraft in inert organic solvent resulting from step I. In this form of the invention, step I is carried out as before, that is, only a portion of the total resin-forming monomer to be used is added to the solution of the EPM or EPDM rubber spine, and the solution is subjected to polymerization as described, to make the "pregraft." The ratio of rubber to monomers in this stage may range, as before, from 40/60 to 90/10. The preferred ratio is 60/40 to 80/20. Again, polymerization is suitably initiated by a conventional free radical initiator and may be carried out under the conditions previously described. While this pregrafting may be carried to substantially complete conversion of the monomers if desired, there is no particular advantage in doing so. In practice it may be more efficient to run this stage to the equilibrium conversion (e.g. about 50–70%), reached in about 4 to 6 hours at 70° C. in a typical case. After this initial portion of resin-forming monomer has thus been graft copolymerized (pregrafted) on the rubber spine, there is thereafter added to the resulting solution of pregraft, the remaining quantity of resin-forming monomer sufficient to provide the desired overall rubber/resin ratio in the final graft polymer. The pregraft solution typically contains residual unconverted monomer that was not graft polymerized in the first stage, as well as some ungrafted rubber and some free resin. The solution is then again subjected to polymerization conditions to produce the final graft. This step is represented as step II–B in the drawing. The additional resin-forming monomer(s) is preferably the same as that used in the pregrafting but a different monomer (or different ratio of monomers to each other) may also be used. The pregraft/monomer ratio may range from 50/50 to 5/95, the preferred range being from 30/70 to 15/85. The weight of the pregraft is taken as the weight of the rubber plus the weight of the monomers converted to polymer in the first stage. (With regard to the amount of additional monomer, the unconverted residual monomer is taken into account.) As before, it is preferred that the rubber content of the final product does not exceed 25%.

The polymerization conditions may be the same as in the pregrafting stage. Thermal or free-radical catalyzed initiation may be used. Conversion is preferably high (95–100%). Modifier may be present.

It is desired to emphasize that even in the just-described "all-solution" method of practicing the invention, it is essential, in order to attain the desired characteristics in the final gum plastic (particularly, high impact strength), that the process be carried out in two stages, the first stage utilizing a portion only of the total stages, forming monomers (pregrafting), and the second stage utilizing the remainder of the resin-forming monomers. If, in contrast, the entire quantity of resin-forming monomers is added in the first instance, optimum properties are not attained.

The all-solution form of the invention is generally characterized by a phase inversion which occurs during the second stage of the polymerization. The inversion ordinarily occurs prior to 50% total monomer conversion and is characterized by a distinct drop in viscosity. The low viscosity permits subsequent conversion to a high solids content (e.g. 50%) in standard equipment without difficulty. The final reaction mixture is more akin to all-mass polymer with diluent than to a solution polymer and can be worked up in the manner used commercially for such polymers, i.e., by vacuum flash evaporation of solvent followed by finishing in a devolatilizing extruder.

The invention obviates certain problems related to poor mill stability (decrease in impact strength upon prolonged milling at elevated temperature) sometimes encountered in the products of known processes. Poor mill stability leads to problems in reproductibility of properties and indicates that serious difficulties can be anticipated in commercial reprocessing of the material. The invention permits high concentrations of reactants in the reaction medium and makes possible fast rates of reaction, with consequent high productivity and low costs. The physical characteristics of the graft solution obtained at the end of the process are favorable, that is, the solution does not tend to set up and become difficult to work up. Problems with poor flow characteristics and excessive shrinkage, sometimes encountered in prior practice, are overcome in the product of the invention. The invention avoids the poor rheometer flow characteristics (giving very bumpy, swollen extrudates) sometimes encountered in prior art blends of EPDM grafts with separately prepared resin. The invention makes unnecessary the conversion of the EPDM solution into a latex as well as the pretreatment of the latex with divinyl benzene or the like. The process of the invention avoids difficulties encountered if it is attempted to prepare the graft entirely by a mass-bead method, notably difficulty in dissolving the rubber in the monomers and difficulties often experienced due to rubber "flocculation" (coming out of solution), as well as poor impact strength in the product, apparently the result of insufficient grafting. The all-solution form of the invention is especially advantageous since it obviates the expense of "floccing" (separating and recovering) the pregraft from the solution and re-dissolving it in monomers. Incomplete conversion of monomers in the first stage need cause no concern and it is unnecessary to remove or recover unconverted monomers; they can simply be left in for the second stage solution polymerization. The presence of solvent throughout the polymerization alleviates the solubility problem and eases strictures on the viscosity of the rubber that can be employed. The all-solution method is particularly adapted to use with polar monomers such as methyl methacrylate. Additives such as stabilizers and gelling agents (e.g. dicumyl peroxide) may be added quite easily to the final polymer cement before work-up.

In one particularly advantageous form of the invention, the pregraft is prepared in the absence of modifier (molecular weight regulator), while the final grafting is carried out in the presence of modifier. Any suitable known modifier may be used, in conventional amounts, such as tertiary alkyl mercaptans. This procedure makes possible a proper balance between impact strength and flow as measured by Mooney. The procedure enables a desirably high degree of grafting to be achieved in the first stage (for good impact strength), while preventing the Mooney viscosity from becoming too high in the second stage.

If desired, the initiator and/or modifier may be added in spaced increments as the polymerization step proceeds, instead of all at once at the beginning of a given polymerization stage.

The following examples, in which all quantities are expressed by weight, will serve to illustrate the practice of the invention in more detail. Examples 1 to 29 are pertinent mainly to the first form (II–A) of the invention, that is, solution pregrafting followed by bulk, bulk-suspension or suspension polymerizaion. Examples 30 to 41 pertain to the all-solution form (II–B) of the invention.

Examples 1, 2, 4, 7, 11, 15, 19 and 21 do not represent the practice of the method of the invention but are included for purposes of comparison with the method of the invention. Examples 3, 6, 10, 13, 16, 18, 22, 24, 26, and 28 combined with, respectively, Examples 5, 8, 12, 14, 17, 20, 23, 25, 27, and 29, represent the method of the invention. Examples 9 and 30–41 also represent the method of the invention. Examples 24 and 25 show the use of EPM (ethylene-propylene binary copolymer) as the rubber spine; other examples show EPDM's in which the third monomer is variously dicyclopentadiene, 5-ethylidene-2-norbornene (Examples 13, 14, 16, 17, 28, 29, 31, 33, 39 and 40), 1,4-hexadiene (Examples 18, 20), and 5-methylene-2-norobornene (Examples 21, 22). Butene-1 as one of the alpha-monoolefins is illustrated in Example 41. Examples 28, 29 show methyl methacrylate as the resin-forming grafted monomer.

Example 1

This example describes the preparation of a gum plastic composition by a direct bulk-suspension polymerization of styrene and acrylonitrile containing an ethylene-propylene terpolymer.

Fifteen parts of an ethylene-propylene-dicyclopentadiene terpolymer (propylene content 40%, iodine number 10.5, 212° F. Mooney 23) was dissolved in 59.5 parts of styrene with stirring. The viscous solution was heated to 93° C. and 25.5 parts of acrylonitrile was added dropwise with constant agitation. After all of the acrylonitrile had been added (90 minutes), 0.2 parts of 40% active dicumyl peroxide and 0.2 parts of a polymerization regulator (consisting of a mixture of 60% dodecyl, 20% tetradecyl and 20% hexadecyl mercaptans) hereinafter referred to as "mixed tertiary mercaptans were added. The mixture was then heated for three hours at 95° C. under a blanket of nitrogen with constant agitation. The mixture was then cooled to 70° C. Monomer conversion had reached 34% at this point. To the viscous mass was added 0.1 part of t-butylperoxypivalate. The mass was then suspended in 200 parts of a 0.2% aqueous polyvinyl alcohol solution. The suspension stage of the polymerization was then continued, with agitation, for 20 hours at 70° C.

The polymer beads were then removed by filtration, washed well with distilled water and stabilized by adding a hexane solution containing 0.7 parts of ditridecyl thiodipropionate and 0.25 parts of 2,2'-methylenebis (4-methyl-6-nonylphenol) and then boiling off the solvent thereby coating the beads with the stabilizers.

The beads were then dried overnight in a 60° C. air oven. They were subsequently heated in the absence of air in a hydraulic press for 15 minutes at 177° C. The heat treated polymer was then milled on a 165° C. mill for 10 minutes. Test bars were compression molded at 177° C. The polymer prepared in this manner had a 1/8" notched Izod impact strength of 0.80 ft. lbs./in. of notch.

Example 2

This example describes the preparation of a gum plastic composition by a direct bulk-suspension polymerization of styrene and acrylonitrile containing an ethylene-propylene terpolymer.

Fifteen parts of an ethylene-propylene-dicyclopentadiene terpolymer (propylene content 40%, iodine number 6.6, 212° F. Mooney 24.5) was dissolved in 59.5 parts of styrene with stirring. The viscous solution was heated to 90° C. and 25.5 parts of acrylonitrile was added dropwise with constant agitation. After all of the acrylonitrile had been added, 0.1 parts of dicumyl peroxide and 0.3 parts of mixed tertiary mercaptans were added. The mixture was then heated for four hours at 85–90° C. under a blanket of nitrogen with constant agitation. The mixture was then cooled to 70° C. Monomer conversion had reached 22% conversion at this point. To the viscous mass was added 0.3 parts of dicumyl peroxide. The mass was then suspended in 200 parts of a 0.2% aqueous polyvinyl alcohol solution. The suspension stage of the polymerization was then continued for 16 hours at 88–93° C. in a pressure reactor. It was then heated at 125–130° C. for an additional three hours.

The polymer beads were recovered, stabilized, dried, heat-treated, milled and molded as described in example 1. The polymer prepared in this manner had a 1/8" notched Izod impact strength of 0.60 ft. lbs./in. of notch.

Example 3

This example describes the preparation of a graft polymer from styrene, acrylonitrile and an ethylene-polylene terpolymer in benzene at a rubber/monomers ratio of 80/20.

To a solution of 100 parts of an ethylene-propylene-dicyclopentadiene terpolymer (same rubber as used in Example 2) in 875 parts of benzene was added 17.5 parts of styrene, 7.5 parts of acrylonitrile and 2 parts of 75% active t-butyl-peroxypivalate. The solution was heated at 70° C. under nitrogen for six hours. It was then evaporated down to a rubbery film. Infrared analysis showed the composition of this film to be 93.4% ethylene-propylene terpolymer, 4.6% styrene and 2.0% acrylonitrile.

Example 4

This example describes the preparation of a gum plastic composition by blending of the graft polymer from Example 3 with a separately prepared styrene-acrylonitrile resin.

On a 165° C. mill was blended 12.5 parts of the graft polymer from Example 2 with 37.5 parts of a 72% styrene-28% acrylonitrile copolymer prepared by a conventional emulsion process. Also incorporated in the blend was 0.35 parts of ditridecyl thiodipropionate and 0.125 parts of 2,2'-methylenebis (4-methyl-6-nonylphenol) as stabilizers. The mixture was mill mixed for 10 minutes, removed as a sheet and test pieces were compression molded at 177° C. The polymer prepared in this manner had a 1/8" notched Izod impact strength of 0.60 ft. lbs./ in. of notch.

Example 5

This example describes the preparation of a gum plastic composition of styrene, acrylonitrile and an ethylene-propylene terpolymer by the process of this invention using the solution graft of Example 3.

To a solution of 84.4 parts of the graft polymer isolated from example 3 in 256 parts of styrene was added 109.7 parts of acrylonitrile dropwise at 90° C. with constant agitation. To the mixture was then added 0.9 parts of dicumyl peroxide and 0.9 parts of mixed tertiary mercaptans. Polymerization proceeded rapidly and after 30 minutes at 90° C., the total solids had reached 39.6%. After another 20 minutes, 0.6 parts of 75% active t-butyl-peroxypivalate was added and the mass was suspended with 900 parts of 0.2% aqueous polyvinyl alcohol solution. The suspension stage of the polymerization was then continued for 17.5 hours at 70° C.

The polymer beads were recovered, stabilized, dried, heat-treated, milled and molded as described in Example 1. The polymer prepared in this manner had a 1/8" notched Izod impact strength of 7.22 ft. lbs./in. of notch.

This example therefore demonstrates the unexpected and remarkably superior properties obtainable by the process of this invention compared with a bulk-suspension polymerization directly on ethylene-propylene terpolymer (Examples 1 and 2) or with a blend of a graft polymer prepared in solution with separately prepared resin (Example 4).

Example 6

This example describes the preparation of a graft polymer from styrene, acrylonitrile and an ethylene-propylene-terpolymer in benzene at a rubber/monomers ratio of 50/50.

To a solution of 50 parts of an ethylene-propylene-dicyclopentadiene terpolymer (same rubber as used in Example 2) in 422 parts of benzene was added 35 parts of styrene, 15 parts of acrylonitrile and 1 part of 75% active t-butyl-peroxypivalate. The solution was heated at 70° C. under nitrogen for six hours. It was then evaporated down to a rubbery film which was dried further in a 60° C. oven. Infrared analysis showed the composition of this film to be 64% ethylene-propylene terpolymer, 25.8% styrene and 10.2% acrylonitrile.

Example 7

This example describes the preparation of a gum plastic composition by blending of the graft polymer from Example 6 with a separately prepared styrene-acrylonitrile resin.

On a 165° C. mill was blended 15 parts of the graft polymer from Example 6 with 35 parts of a 72% styrene-28% acrylonitrile copolymer prepared by a conventional emulsion process. Also incorporated in the blend was 0.35 parts of ditridecyl thiodipropionate and 0.125 parts of 2,2'-methylenebis(4 - methyl - 6 - nonylphenol) as stabilizers. The mixture was mill mixed for 10 minutes, removed as a sheet and test pieces were compression molded at 177° C. The polymer prepared in this manner had a 1/8" notched Izod impact strength of 2.31 ft. lbs./in. of notch.

Example 8

This example describes the preparation of a gum plastic composition of styrene, acrylonitrile and an ethylene-propylene terpolymer by the process of this invention using the solution graft of Example 6.

To a solution of 30 parts of the graft polymer isolated from Example 6 in 49 parts of styrene was added 21 parts of acrylonitrile dropwise at 80° with constant agitation. To the mixture was then added 0.4 parts of mixed tertiary mercaptans and 0.2 parts of dicumyl peroxide. After three hours at 80–90° C. the total solids had reached 56.6%. The mass was cooled to 70° C., 0.1 part of t-butylperoxypivalate was added and the mass was suspended with 200 parts of 0.2% aqueous polyvinyl alcohol solution. The suspension stage of the polymerization was then continued for 19 hours at 70° C.

The polymer beads were recovered, stabilized, dried, heat-treated, milled and molded as described in Example 1. The polymer prepared in this manner had a ⅛" notched Izod impact strength of 7.70 ft. lb./in. of notch.

Example 9

This example demonstrates the use of benzoyl peroxide as the solution stage initiator in the process of this invention.

To a solution of 100 parts of an ethylene-propylene-dicyclopentadiene terpolymer (same rubber as used in Example 2) in 809 parts of benzene was added 17.5 parts of styrene, 7.5 parts of acrylonitrile and 1 part of benzoyl peroxide. The solution was heated at 80° C. under nitrogen for 20 hours. The solution was evaporated to a rubbery film. Infrared analysis showed the composition to be 9% styrene, 2.5% acrylonitrile and 88.5% ethylene-propylene terpolymer.

A portion of this pregraft (84.4 parts) was dissolved in 256 parts of styrene. The solution was heated to 80° C. and 109.7 parts of acrylonitrile was added over a period of one hour with constant agitation. To the solution was added 0.9 parts of mixed tertiary mercaptans and 0.9 parts of dicumyl peroxide. Polymerization proceeded rapidly and after 45 minutes the total solids had reached 52.4%. The mixture was cooled to 70° C. and 0.1 part of t-butylperoxypivalate was added. The mass was suspended with 900 parts of 0.2% aqueous polyvinyl alcohol solution. The suspension stage of the polymerization was then continued for 20 hours at 70° C.

The polymer beads were recovered, stabilized, dried, heat-treated, milled and molded as described in Example 1. The polymer prepared in this manner had a ⅛" notched Izod impact strength of 5.00 ft. lbs./in. of notch.

Example 10

This example describes the preparation of a graft polymer from styrene, acrylonitrile and an ethylene-propylene terpolymer in benzene at a rubber/monomers ratio of 60/40 using di-t-butyl peroxide as initiator at 120° C.

To a solution of 60 parts of an ethylene-propylene-dicyclopentadiene terpolymer (same rubber as used in Example 2) in 830 parts of benzene was added 28 parts of styrene, 12 parts of acrylonitrile and 0.4 parts of di-t-butyl peroxide. The solution was charged to a stirred pressure vessel which was purged three times with nitrogen. It was then heated slowly to 120° C. (90 minutes) and stirred for an additional 17.5 hours at 120° C. The solution was then evaporated to a rubbery film. Infrared analysis showed the composition to be 74.7% ethylene-propylene terpolymer, 18.8% styrene and 6.5% acrylonitrile.

Example 11

This example describes the preparation of a gum plastic composition by blending of the solution graft of Example 10 with separately prepared styrene-acrylonitrile resin.

A polymer was prepared by mill blending the graft polymer from Example 10 with a styrene-acrylonitrile emulsion resin as described in Example 4. The material, which had a rubber content of 18.7%, had an ⅛" notched Izod impact strength of 2.25 ft. lbs./in. of notch.

Example 12

This Example describes the preparation of a gum plastic composition of styrene, acrylonitrile and an ethylene-propylene terpolymer by the process of this invention using the solution graft of Example 10.

To a solution of 25 parts of the solution graft from Example 10 in 52.5 parts of styrene was added 22.5 parts of acrylonitrile dropwise at 80° C. with constant agitation. To the mixture was then added 0.2 part of dicumyl peroxide and 0.3 part of mixed tertiary mercaptans. The mixture was then heated for 2⅓ hours at 80–90° C. under a blanket of nitrogen with constant agitation. The mass was cooled to 70° C., 0.2 part of azobis (isobutyronitrile) was added and the mass was suspended with 200 parts of 0.2% aqueous polyvinyl alcohol solution. The suspension stage of the polymerization was then continued for 24 hours at 70° C.

The polymer beads were recovered, stabilized, dried, heat-treated, milled and molded as described in Example 1. The polymer prepared in this manner had a ⅛" notched Izod impact strength of 6.34 ft. lbs./in. of notch.

Example 13

This example describes the preparation of a graft polymer from styrene, acrylonitrile and an ethylene-propylene-5-ethylidene-2-norbornene terpolymer at a rubber/monomers ratio of 70/30 using benzoyl peroxide as initiator.

To a solution of 105 parts of an ethylene-propylene-5-ethylidene-2-norbornene terpolymer (propylene content 55%; 260° Mooney Viscosity 11; iodine number 8) in 945 parts of benzene was added 31.5 parts of styrene, 13.5 parts of acrylonitrile and 1.5 parts of benzoyl peroxide. The solution was heated at 80° for 18 hours under nitrogen. The solution was evaporated to an elastomeric film containing about 80% ethylene-propylene terpolymer.

Example 14

This example describes the preparation of a gum plastic composition of styrene, acrylonitrile and an ethylene-propylene terpolymer by the process of this invention using the solution graft of Example 13.

To a solution of 84.5 parts of the solution graft from Example 13 in 256 parts of styrene was added 110 parts of acrylonitrile dropwise at 50° C. with constant agitation. To the mixture was then added 1.35 parts of mixed tertiary mercaptans and 0.45 parts of dicumyl peroxide. After two hours at 55–60° C. the total solids had reached 38.6%. To the mixture was then added 0.9 parts of azobis (isobutyronitrile) and the mass was suspended with 900 parts of 0.2% aqueous polyvinyl alcohol solution. The suspension stage of the polymerization was then continued for 20 hours at 70° C.

The polymer beads were recovered, stabilized, dried, heat-treated, milled and molded as described in Example 1. The polymer prepared in this manner had a ⅛" notched Izod impact strength of 4.54 ft. lbs./in. of notch.

Example 15

This example describes the attempted preparation of a graft polymer from styrene, acrylonitrile and an ethylene-propylene-5-ethylidene-2-norbornene terpolymer by a direct bulk-suspension process.

To a solution of 67.5 parts of an ethylene-propylene-5-ethylidene-2-norbornene terpolymer (percent propylene 34.3; 212° F. Mooney 48, iodine number 8) in 268 parts of styrene was added 115 parts of acrylonitrile dropwise at 50–60° C. with constant agitation. During the addition of acrylonitrile the rubber precipitated out of solution and formed a large solid mass which could not be dispersed.

Example 16

This example describes the preparation of a graft polymer from styrene, acrylonitrile and an ethylene-propylene-5-ethylidene-2-norbornene terpolymer in benzene at a rubber/monomers ratio of 50/50.

To a solution of 100 parts of an ethylene-propylene-5-ethylidene-2-norbornene terpolymer (% propylene 34.3; 212° F. Mooney 48; iodine number 8) in 900 parts of benzene was added 70 parts of styrene, 30 parts of acrylonitrile and 1.33 parts of t-butylperoxy pivalate (75% active). The solution was heated at 70° under nitrogen for 18 hours. The solution was then evaporated to an elastomeric film. Infrared analysis showed the composition to be 74% ethylene-propylene terpolymer, 20% styrene and 0% acrylonitrile.

Example 17

This example describes the preparation of a gum plastic composition of styrene, acrylonitrile and an ethylene-propylene-5-ethylidene-2-norbornene terpolymer prepared by the process of this invention using the solution graft of Example 16.

To a solution of 91 parts of the solution graft of Example 16 in 251 parts of styrene was added 108 g. of acrylonitrile dropwise at 50° with constant agitation. To the mixture was then added 1.35 parts of mixed tertiary mercaptans and 0.45 parts of dicumyl peroxide. After 2½ hours at 60–70° C. under nitrogen with agitation, the total solids had reached 38%. To the mixture was then added 0.9 parts of azobis (isobutyronitrile) and the mass was suspended with 900 parts of 0.2% aqueous polyvinyl alcohol solution. The suspension stage of the polymerization was then continued for 20 hours at 70° C.

The polymer beads were recovered, stabilized, dried, heat-treated, milled and molded as described in Example 1. The polymer prepared in this manner had a ⅛″ notched Izod impact strength of 4.98 ft. lbs./in. of notch.

Example 18

This example describes the preparation of a graft polymer from styrene, acrylonitrile and an ethylene-propylene-1,4-hexadiene terpolymer at a rubber/monomer ratio of 70/30 in benzene.

To a solution of 189 parts of an ethylene-propylene-1,4-hexadiene terpolymer (43% propylene; 250° F. Mooney 16; iodine number 12.3) in 1700 parts of benzene was added 56.5 parts of styrene, 24.5 parts of acrylonitrile and 3.8 parts of t-butylperoxypivalate (75% active). The solution was heated at 70° C. under nitrogen for 20 hours. It was then evaporated to an elastomeric film containing about 80% of the ethylene-propylene terpolymer.

Example 19

This example describes the preparation of a gum plastic composition by blending of the solution graft of Example 18 with separately prepared styrene-acrylonitrile resin.

A polymer was prepared by mill blending the graft polymer from Example 18 with a styrene-acylonitrile emulsion resin as described in Example 4. The material, which had a rubber content of 15%, had a ⅛″ notched Izod impact strength of 0.90 ft. lbs./in. of notch.

Example 20

This example describes the preparation of a gum plastic composition of styrene, acrylonitrile and an ethylene-propylene-1,4-hexadiene terpolymer prepared by the process of this invention using the solution graft of Example 18.

To a solution of 82 parts of the solution graft of Example 18 in 259 parts of styrene was added 111 parts of acrylonitrile dropwise at 60° C. with constant agitation. To the mixture was then added 1.35 parts of mixed tertiary mercaptans and 0.45 parts of dicumyl peroxide. After 5½ hours at 60–70° C. under nitrogen with agitation, the total solids had exceeded 35%. To the mixture was then added 0.9 parts of azobis, isobutyronitrile) and it was suspended with 900 parts of 0.2% aqueous polyvinyl alcohol solution. The suspension stage of the polymerization was then continued for 20 hours at 70° C.

The polymer beads were recovered, stabilized, dried, heat-treated, milled and molded as described in Example 1. The polymer prepared in this manner had a ⅛″ notched Izod impact strength of 4.39 ft. lbs./in. of notch.

Example 21

This example describes the preparation of a graft polymer from styrene, acrylonitrile and an ethylene-propylene-5-methylene-2-norbornene terpolymer by a direct mass-suspension process.

To a solution of 67.5 parts of an ethylene-propylene-5-methylene-2-norbornene terpolymer (43% propylene; iodine number 5) in 268 parts of styrene was added 114.5 parts of acrylonitrile dropwise at 55° C. with constant agitation. To the mixture was then added 1.35 parts of mixed tertiary mercaptans and 0.45 parts of dicumyl peroxide. After four hours at 60–70° C. under nitrogen, the temperature was raised to 85–90° C. since conversion was slow. After 2 more hours, the total solids had exceeded 35%. To the mixture was then added 0.9 part of azobis (isobutyronitrile) and it was suspended with 900 parts of 0.2% aqueous polyvinyl alcohol solution. The suspension stage of the polymerization was then continued for 20 hours at 70° C.

The polymer beads were recovered, stabilized, dried, heat-treated, milled and molded as described in Example 1. The polymer prepared in this manner had a ⅛″ notched Izod impact strength of 0.51 ft. lbs./in. of notch.

Example 22

This example describes the preparation of a graft polymer from styrene, acrylonitrile and an ethylene-propylene-5-methylene-2-norbornene terpolymer in benzene at a rubber/monomers ratio of 70/30.

To a solution of 195 parts of the ethylene-propylene-5-methylene-2-norbornene terpolymer (described in Example 21) in 1760 parts of benzene was added 58 parts of styrene, 26 parts of acrylonitrile and 3.9 parts of t-butylperoxypivalate. The solution was heated at 70° C. under nitrogen for 20 hours. It was then evaporated to an elastomeric film containing about 80% of the ethylene-propylene terpolymer.

Example 23

This example describes the preparation of a gum plastic composition of styrene, acrylonitrile and an ethylene-propylene-5-methylene-2-norbornene terpolymer prepared by the process of this invention using the solution graft of Example 22.

To a solution of 82 parts of the solution graft of Example 22 in 259 parts of styrene was added 111 parts of acrylonitrile dropwise at 50–60° C. with constant agitation. To the mixture was then added 1.35 parts of mixed tertiary mercaptans and 0.45 part of dicumyl peroxide. After 2½ hours at 68–74° C. under nitrogen with agitation, the total solids had exceeded 25%. To the mixture was then added 0.9 parts of azobis (isobutyronitrile) and it was suspended with 900 parts of 0.2% aqueous polyvinyl alcohol solution. The suspension stage of the polymerization was then continued for 17 hours at 70° C.

The polymer beads were recovered, stabilized, dried, heat-treated, milled and molded as described in Example 1. The polymer prepared in this manner had a ⅛″ notched Izod impact strength of 14.7 ft. lbs./in. of notch.

The comparative impact properties illustrated by these examples are summarized in Table I. The process of this invention, solution/mass-suspension, gives superior impact strength compared to direct mass-suspension or to a blend of a solution graft with separately prepared resin ("Solution blend").

TABLE I

⅛" Notched Izod Impact in ft. lbs./in. of notch

| Example: | Mass-suspension | Solution blend | Solution/mass-suspension |
|---|---|---|---|
| 1 | | 0.80 | |
| 2 | | 0.60 | |
| 4 | | 0.60 | |
| 5 | | | 7.22 |
| 7 | | 2.31 | |
| 8 | | | 7.78 |
| 9 | | | 5.00 |
| 11 | | 2.25 | |
| 12 | | | 6.34 |
| 14 | | | 4.54 |
| 17 | | | 4.98 |
| 19 | | 0.90 | |
| 20 | | | 4.39 |
| 21 | 0.51 | | |
| 23 | | | 14.70 |

Example 24

This example describes the preparation of a graft polymer from styrene, acrylonitrile and an ethylene-propylene binary copolymer in benzene at a rubber/monomers ratio of 50/50.

To a solution of 50 parts of an ethylene-propylene binary copolymer (E/P ratio 60/40, 212° F. Mooney 32, iodine number nil) in 1080 parts of benzene was added 35 parts of styrene, 15 parts of acrylonitrile and 1.0 part of 75% active t-butylperoxypivalate. The solution was heated at 70° C. under nitrogen for 23 hours. It was then evaporated to an elastomeric film containing about 56% ethylene-propylene copolymer.

Example 25

This example describes the preparation of a gum plastic composition of styrene, acrylonitrile and an ethylene-propylene copolymer prepared by the process of this invention using the solution graft of Example 24.

To a solution of 30 parts of the solution graft of Example 24 in 49 parts of styrene was added 21 parts of acrylonitrile dropwise at 80° C. with constant agitation. To the mixture was added 0.3 part of mixed tertiary mercaptans and 0.2 part of dicumyl peroxide. After 1½ hours at 90° C. under nitrogen with agitation, the total solids had exceeded 35%. To the mixture was then added 0.2 part of azobis (isobutyronitrile) and it was suspended with 200 parts of 0.2% aqueous polyvinyl alcohol solution. The suspension stage of the polymerization was then continued for 17 hours at 70° C.

The polymer beads were recovered, stabilized, dried, heat-treated, milled and molded as described in Example 1. The polymer prepared in this manner had a ⅛" notched Izod impact strength of 2.4 ft. lbs./in. of notch.

Example 26

This example describes the preparation of a graft polymer from styrene and an ethylene-propylene-dicyclopentadiene terpolymer in benzene at a rubber/monomers ratio of 80/20.

To a solution of 100 parts of an ethylene-propylene-dicyclopentadiene terpolymer (same rubber as used in Example 2) in 875 parts of benzene was added 25 parts of styrene and 1 part of 75% active t-butylperoxypivalate. The solution was heated at 70° C. under nitrogen for five hours. It was then evaporated to an elastomeric film.

Example 27

This example describes the preparation of a gum plastic composition of styrene and an ethylene-propylene-dicyclopentadiene terpolymer prepared by the process of this invention using the solution graft of Example 26.

To a solution of 18.7 parts of the solution graft of Example 26 in 81.3 parts of styrene was added 0.2 part of mixed tertiary mercaptans and 0.2 part of dicumyl peroxide. The mixture was heated at 95° C. for 4 hours, the total solids reaching 27.9%. Another 0.2 part of dicumyl peroxide was added and the mixture was heated for another 3 hours at 95° C. The total solids reached 49.6%. To the mixture was then added 0.1 part of 75% active t-butylperoxypivalate and it was suspended with 200 parts of 0.2% aqueous polyvinyl alcohol. The suspension stage of the polymerization was then continued for 18 hours at 70° C.

The polymer beads were recovered, stabilized, dried, heat-treated, milled and molded as described in Example 1. The polymer prepared in this manner had a ⅛" notched Izod impact strength of 2.5 ft. lbs./in. of notch.

Example 28

This example describes the preparation of a graft polymer from methyl methacrylate and an ethylene-propylene-5-ethylidene-2-norbornene terpolymer in benzene at a rubber/monomers ratio of 60/40.

To a solution of 100 parts of an ethylene-propylene-ethylidene norbornene terpolymer (same rubber as used in Example 16) in 900 parts of benzene was added 67 parts of methyl methacrylate and 2 parts of 75% active t-butylperoxypivalate. The solution was heated at 70° C. under nitrogen for 24 hours. The solution was then evaporated to an elastomeric film.

Example 29

This example describes the preparation of a gum plastic composition of styrene, methyl methacrylate and an ethylene-propylene-5-ethylidene-2-norbornene terpolymer prepared by the process of this invention using the solution graft of Example 28.

To a solution of 84 parts of the solution graft of Example 28 in 184 parts of styrene was added 184 parts of methyl methacrylate dropwise at 30° C. with constant agitation. To the mixture was then added 1.35 parts of mixed tertiary mercaptans and 0.45 parts of dicumyl peroxide. After 80 minutes at 70° C. under nitrogen with agitation, the total solids had reached 40%. To the mixture was then added 0.9 part of azobis (isobutyronitrile) and the mass was suspended with 900 parts of 0.2% aqueous polyvinyl alcohol solution. The suspension stage of the polymerization was then continued for 22 hours at 70° C.

The polymer beads were recovered, stabilized, dried, heat-treated, milled and molded as described in Example 1. The polymer prepared in this manner had a ⅛" notched Izod impact strength of 3.61 ft. lbs./in. of notch.

Example 30

This example illustrates the "all-solution" form of the invention.

(I) The rubber employed as the spine is ethylene-propylene-dicyclopentadiene terpolymer containing 40% propylene, iodine number 6.6, Mooney viscosity 24.5 ML-4 at 212° F.; 15 parts of the rubber is dissolved in 50 parts of benzene, and the resin-forming monomers, namely, 7 parts of styrene and 3 parts of acrylonitrile added; 0.3 part of t-butylperoxypivalate is added. The solution is heated at 70° C., with agitation for 21 hours. The conversion of monomers in this stage is about 60%.

(II-B) In the second stage, an additional 50 parts of benzene, 52.5 parts of styrene and 22.4 parts of acrylonitrile are added to the solution resulting from step I. 0.3 part of mixed tertiary mercaptans ($C_{12}$–$C_{16}$), 0.1 part of dicumyl peroxide, and 0.1 part of t-butylperoxypivalate are added. The solution is agitated while heating at a temperature of about 70–75° C. After about 4–12 hours an inversion takes place, accompanied by a drop in viscosity. Another 0.1 part of t-butylperoxypivalate is added. The reaction is continued to a total of 50 hours, representing 98.2% conversion. The solvent is evaporated with steam to recover the polymer (it is dried, heat-treated, milled and molded as described in Example 1). The polymer has an impact strength of 7.70 (⅛ inch noticed Izod), a Mooney viscosity 41.5 (ML-4 at 350° F.), a Rockwell "R" hardness of 104. This example is summarized in Table II.

In a repeat of this example in which all of the resin-forming monomers are added in step I (in the presence of 100 parts of benzene, the modifier being added at a conversion equivalent to the beginning of the second stage of this example) the impact strength is significantly less, namely, 5 foot pounds.

Example 41

In this example the two-step all-solution method is carried out, using ethylene/butene-1/dicyclopentadiene terpolymer (17% butene-1; iodine number 11.4; ML-4 at 212° F. 70) as summarized in Table II.

The described gum plastics which are graft copolymers of resin-forming monomers on rubbers which are copolymers of at least two different alpha-monoolefins (includ-

TABLE II

| Example | 30 | 31 | 32 | 33 | 34 | 35 | 36 |
|---|---|---|---|---|---|---|---|
| 212° Mooney | 24.5 | 48 | 24.5 | 48 | 24.5 | 24.5 | 24.5 |
| 1st stage: | | | | | | | |
| Rubber | 15 | 15 | 15 | 15 | 15 | 15 | 15 |
| Styrene | 7 | 7 | 7 | 7 | 7 | 7 | 7 |
| Acrylonitrile | 3 | 3 | 3 | 3 | 3 | 3 | 3 |
| Benzene | 50 | 100 | 100 | | 100 | 100 | 100 |
| Lupersol 11 (t-butylperoxy pivalate) | 0.3 | 0.3 | 0.3 | 0.3 | 0.3 | 0.3 | 0.3 |
| Temperature | 70 | 70 | 70 | 70 | 70-74 | 70-74 | 70-74 |
| Time | 21 | 18 | 18 | 18 | 21 | 21 | 21 |
| 2d stage: | | | | | | | |
| Benzene | 50 | | | | | | |
| Styrene | 52.5 | 52.5 | 52.5 | 52.5 | 52.5 | 52.5 | 52.5 |
| Acrylonitrile | 22.5 | 22.5 | 22.5 | 22.5 | 22.5 | 22.5 | 22.5 |
| MTM (mixed tertiary mercaptans) | 0.3 | 0.3 | 0.3 | 0.3 | 0.3 | 0.3 | 0.3 |
| DiCup (dicumyl peroxide) | 0.1 | 0.1 | 1.0 | 0.1 | 0.2 | 0.4 | 0.6 |
| Lupersol 11 | 0.2 | 0.3 | 0.3 | 0.2 | 0.2 | 0.2 | 0.2 |
| Time | 50 | 48 | 48 | 72 | 46 | 46 | 46 |
| Temperature | 70-75 | 70-85 | 70 | 70-100 | 70-80 | 70-80 | 70-80 |
| Percent conversion | 98.2 | 100 | 100 | 99.6 | 96 | 96 | 96 |
| ⅛" Izod | 7.70 | 11.3 | 43.5 | 38.7 | 7.24 | 8.40 | 8.57 |
| 350° Mooney | 41.5 | 48 | 19.5 | 35.5 | 40.5 | 33.5 | 27 |
| Rockwell "R" | 104 | 107 | 102 | 96 | 97 | 99 | 102 |

TABLE III

| Example | 37 | 38 | 39 | 40 | 41 |
|---|---|---|---|---|---|
| 212° Mooney | 37 | 37 | 43 | 43 | 70 |
| 1st stage: | | | | | |
| Rubber | 15 | 15 | 15 | 15 | 15 |
| Styrene | 7 | 7 | 7 | 7 | 7 |
| Acrylonitrile | 3 | 3 | 3 | 3 | 3 |
| Benzene | 100 | 100 | 0 | 100 | 100 |
| Lupersol 11 (t-butylperoxypivalate) | 0.3 | 0.3 | 0.3 | 0.3 | 0.3 |
| Temperature | 70 | 70 | 70 | 70 | 70 |
| Time | 18 | 18 | 18 | 18 | 24 |
| 2d stage: | | | | | |
| Benzene | | | | | |
| Styrene | 52.5 | 52.5 | 52.5 | 52.5 | 52.5 |
| Acrylonitrile | 22.5 | 22.5 | 22.5 | 22.5 | 22.5 |
| MTM (mixed tertiary mercaptans) | 0.3 | 0.3 | 0.3 | 0.3 | 0.3 |
| DiCup (dicumyl peroxide) | 0.1 | 0.4 | 0.1 | 0.5 | 0.4 |
| Lupersol 11 | 0.3 | 0.3 | 0.3 | 0.3 | 0.3 |
| Time | 72 | 72 | 53 | 53 | 120 |
| Temperature | 70-75 | 70-75 | 70-80 | 70-80 | 70-80 |
| Percent conversion | 96 | 96 | 95.5 | 95.5 | 100 |
| ⅛" Izod | 8.85 | 11.1 | 9.4 | 9.1 | 9.82 |
| 350° Mooney | 52 | 38 | 43 | 33.5 | |
| Rockwell "R" | 96 | 99 | | | |

Examples 31–40

Additional all-solution runs are carried out, using essentially the procedure of Example 30, as summarized in Table II. In Examples 32, 34, 35 and 36 the rubber employed is the same as in Example 30. In Examples 31 and 33 the rubber is a terpolymer of ethylene, propylene, and 5-ethylidene-2-norbornene (34% propylene, iodine number 7.8, ML-4 at 212° F. 47). In Examples 37 and 38 the rubber is ethylene-propylene-dicyclopentadiene terpolymer (32% propylene, iodine number 9.9, ML-4 52). In examples 39 and 40 the rubber is ethylene-propylene-5-ethylidene-2-norbornene terpolymer (37% propylene, iodine number 7, ML-4 43). Excellent impact strength is obtained using these four different rubbers representing variations in tremonomer type and Mooney.

Increasing the dicumyl peroxide concentration (using the same heat-treatment on the final polymer) leads to a gradual and significant improvement in rheometer flow characteristics at no sacrifice in impact strength. This is illustrated by Examples 34, 35, and 36 in which one polymer is divided into three portions and varying dicumyl peroxide levels incorporated before removal of the solvent. This series also illustrates that the 350° F. Mooney viscosity drops with increasing dicumyl peroxide.

ing EPM and EPDM) made according to the method of the invention represent a remarkable improvement over the gum plastics of the same monomer components made by conventional methods. Furthermore, the graft copolymers of resin-forming monomers on rubbers which are copolymers of at least two different alpha-monoolefins with 5-ethylidene-2-norbornene are novel graft copolymers having highly interesting properties, and although they are preferably made by the method of the invention, such graft copolymers of the invention may also be made by conventional methods if desired.

Having thus described my invention, what I claim and desire to protect by Letters Patent is:

1. A graft copolymer of free-radical polymerizable monoethylenically unsaturated resin-forming monomeric material which is a mixture of styrene and acrylonitrile on a rubbery spine which is an ethylene-propylene-5-ethylidene-2-norbornene terpolymer, the ratio of ethylene to propylene in the terpolymer ranging from 40/60 to 75/25, by weight, the amount of 5-ethylidene-2-norbornene in the terpolymer ranging from about 1 to about 20%, by weight, the amount of said terpolymer being from 2 to 94.7% and the amount of said resin-forming monomeric material being correspondingly from 98 to 5.3%, by weight.

References Cited

UNITED STATES PATENTS

| | | | |
|---|---|---|---|
| 3,642,950 | 2/1972 | O'Shea | 260—878 R |
| 3,458,602 | 8/1969 | Pollock | 260—880 |
| 3,461,188 | 8/1969 | Baer | 260—878 |
| 3,488,743 | 1/1970 | Baer et al | 260—879 |
| 3,488,744 | 1/1970 | Nemphos et al. | 260—880 |
| 3,489,821 | 1/1970 | Witt et al. | 260—876 |
| 3,489,822 | 1/1970 | Witt et al. | 260—878 |
| 3,538,190 | 11/1970 | Meredith et al. | 260—878 R |
| 3,538,191 | 11/1970 | Meredith et al. | 260—878 R |
| 3,538,192 | 11/1970 | Bishop | 260—878 R |
| 3,646,168 | 2/1972 | Barrett | 260—80.78 |
| 3,646,169 | 2/1972 | Wirth | 260—80.78 |

HARRY WONG, Jr., Primary Examiner

U.S. Cl. X.R.

204—159.14; 260—33.6 PQ, 33.8 UA, 879, 880 R, 897 B